United States Patent
Grimm et al.

(10) Patent No.: US 7,419,541 B2
(45) Date of Patent: *Sep. 2, 2008

(54) MONOAZO PIGMENT PREPARATIONS BASED ON C.I. PIGMENT YELLOW 74

(75) Inventors: Felix W. Grimm, Hofheim (DE); Bernd Nestler, Kakegawa (JP); Joerg Schueller, Bruehl (DE); Wojciech Nieradzik, Mueddersheim (DE); Werner Sindermann, Huerth (DE); Joachim Weber, Reinach (CH); Ruediger Jung, Kelkheim (DE)

(73) Assignee: lariant Produkte (Deutschland) GmbH, Franklfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/582,769

(22) PCT Filed: Dec. 8, 2004

(86) PCT No.: PCT/EP2004/013946

§ 371 (c)(1),
(2), (4) Date: Nov. 29, 2006

(87) PCT Pub. No.: WO2005/056695

PCT Pub. Date: Jun. 23, 2005

(65) Prior Publication Data

US 2007/0128532 A1    Jun. 7, 2007

(30) Foreign Application Priority Data

Dec. 12, 2003 (DE) ................................. 103 58 209

(51) Int. Cl.
C09B 67/22 (2006.01)
C09B 67/20 (2006.01)
C09D 11/00 (2006.01)
C09D 11/02 (2006.01)

(52) U.S. Cl. ...................... 106/496; 106/31.8; 47/57.6; 430/7; 430/108.23; 524/159; 524/190

(58) Field of Classification Search ................. 106/31.8, 106/496; 47/57.6; 430/108.23, 7; 524/159, 524/190
See application file for complete search history.

(56) References Cited

U.S. PATENT DOCUMENTS

| | | | |
|---|---|---|---|
| 3,759,733 A | 9/1973 | Bradley et al. | |
| 4,457,783 A | 7/1984 | Hamilton et al. | |
| 5,024,698 A | 6/1991 | Schwartz et al. | |
| 5,271,759 A | 12/1993 | Wooden et al. | |
| 6,503,317 B1 | 1/2003 | Ortalano et al. | |
| 6,504,045 B2 | 1/2003 | Jung et al. | |
| 6,918,958 B2 | 7/2005 | Weber et al. | |
| 2007/0125260 A1* | 6/2007 | Grimm et al. ............. 106/31.6 | |
| 2007/0169665 A1* | 7/2007 | Schweikart et al. ........ 106/31.8 | |

FOREIGN PATENT DOCUMENTS

| | | |
|---|---|---|
| DE | 2739775 | 3/1978 |
| DE | 4214868 | 11/1992 |
| EP | 1315588 | 6/2003 |
| GB | 1569837 | 6/1980 |
| GB | 2356634 | 5/2001 |
| GB | 2364322 | 1/2002 |
| GB | EP 1316588 | 6/2003 |
| JP | 45-11026 | 4/1970 |
| JP | 45011026 | 4/1970 |
| JP | 10-158555 | 6/1998 |
| JP | 10158555 | 6/1998 |
| WO | WO 02/064680 | 8/2002 |

OTHER PUBLICATIONS

U.S. Appl. No. 10/582,770, by Grimm et al., filed Jun. 12, 2006.
U.S. Appl. No. 10/590,828, by Schueikort et al., filed Aug. 25, 2006.
U.S. Appl. No. 10/579,344, by Weber et al., filed May 12, 2006.
PCT International Search Report for PCT/EP2004/013946, mailed Apr. 8, 2005.
English abstract for JP 2000 239594, Sep. 5, 2000.
English Translation of PCT International Preliminary Report on Patentability for PCT/EP 2004/013946, mailed Sep. 8, 2006.
USPTO Office Action against Co-pending U.S. Appl. No. 10/582,770, by Grimm et al., filed Jun. 12, 2006; mailed Sep. 7, 2007.
PCT International Search Report for PCT/EP 2004/013945, mailed Apr. 15, 2005.
English Translation of PCT Preliminary Report on Patentability for PCT/EP 2004/013945, mailed Dec. 8, 2004.

\* cited by examiner

*Primary Examiner*—Anthony J Green
(74) *Attorney, Agent, or Firm*—Anthony A. Bisulca

(57) ABSTRACT

A pigment preparation comprising C.I. Pigment Yellow 74 of formula (I) as base pigment and C.I. Pigment Yellow 62 of formula (II) as pigment dispersant.

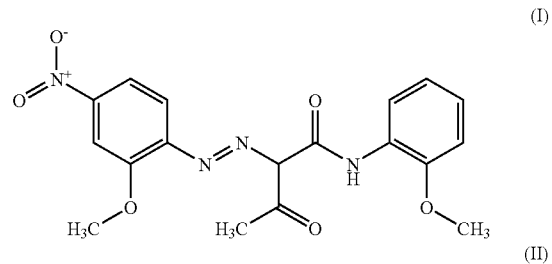

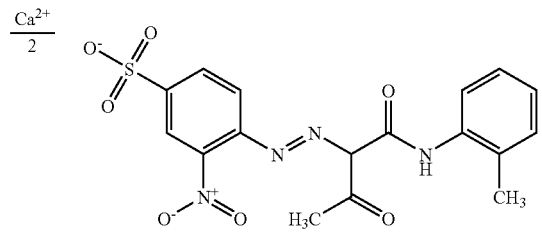

9 Claims, No Drawings

MONOAZO PIGMENT PREPARATIONS BASED ON C.I. PIGMENT YELLOW 74

The present invention relates to monoazo pigment preparations based on C.I. Pigment Yellow 74 and also to their production and use for coloring high molecular weight materials.

U.S. Pat. No. 3,759,733 discloses pigment preparations comprising the coupling product of a diazotized aniline with an acetoacetylarylamide and comprising a water-soluble dye.

JP-45-11026 likewise discloses pigment preparations comprising the coupling product of a diazotized aniline with an acetoacetylarylamide and comprising a water-soluble dye.

EP-A-1 316 588 discloses specific pigment preparations comprising carboxamide-or sulfonamide-substituted derivatives.

Where pigment preparations are used for coloring high molecular weight organic materials the requirements imposed on the performance properties of the pigments are exacting, such as high color strengths, high chromaticity (chroma) and good light fastness, and weather fastness. When they are used in printing systems, low printing ink viscosities are required; when they are used in coating systems, the requirements include flawless recoat fastnesses, low viscosity on the part of the highly pigmented paint concentrates (millbase) and of the fully prepared coating materials, and, especially in the case of metallic finishes, high transparency and brilliant hues. In the case of the coloring of plastics, good dispersibility is called for, and is manifested, for example, in high color strengths. A further desire is for universal usefulness, as far as possible, in different systems, such as in aqueous and solvent-borne systems, for example.

The known monoazo pigment preparations based on C.I. Pigment Yellow 74 do not satisfy all present-day requirements. Consequently there was a need to find yellow pigment preparations which exhibit improved properties.

It has been found that the object is surprisingly achieved through the pigment preparation defined below.

The present invention provides a pigment preparation comprising C.I. Pigment Yellow 74 of formula (I) as base pigment and C.I. Pigment Yellow 62 of formula (II) as pigment dispersant.

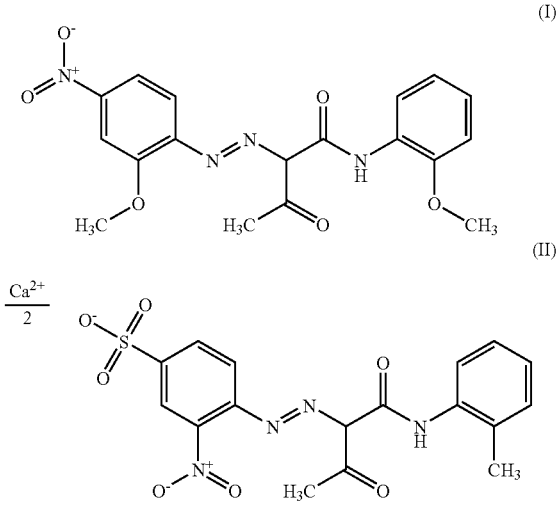

Preferred pigment preparations for the purposes of the present invention contain a) 50% to 99.9%, preferably 60% to 99.5%, with particular preference 65% to 99% by weight of C.I. Pigment Yellow 74,
b) 0.1% to 25%, preferably 0.5% to 15%, with particular preference 1% to 10% by weight of C.I. Pigment Yellow 62,
c) 0 to 25%, preferably 0.1 to 15% by weight of auxiliaries, the fractions of the respective components being based on the total weight of the preparation (100% by weight).

Examples of suitable auxiliaries include surfactants, dispersants, fillers, standardizers, resins, waxes, defoamers, antidust agents, extenders, antistats, shading colorants, preservatives, drying retarders, rheology control additives, wetting agents, antioxidants, UV absorbers, light stabilizers, or a combination thereof.

Shading components are typically used in amounts up to 10% by weight and auxiliaries in amounts up to 40% by weight, based in each case on the total amount of the C.I. Pigment Yellow 74 used in accordance with the invention. In exceptional cases, however, larger amounts may also be present.

The pigment preparation of the invention can be prepared by a variety of processes: for example, by mixing the base pigment and the pigment dispersant with one another after separate synthesis, and, where appropriate, mixing the auxiliary or auxiliaries with one another, or by synthesizing the pigment dispersant and the base pigment together.

C.I. Pigment Yellow 74 and C.I. Pigment Yellow 62 are known compounds which can be prepared by processes known to the skilled worker, by means of azo coupling, in which a corresponding amine is diazotized and coupled to the corresponding acetoacetanilide coupler. In the case of C.I. Pigment Yellow 62 the free acid, i.e., C.I. Pigment Yellow 62:1, or a relatively readily soluble salt of the pigment dispersant is commonly prepared by azo coupling and subsequently laked with a calcium salt or calcium hydroxide. Since laking does not always proceed to completion, it is also possible for there still to be small fractions of free sulfo acid (C.I. Pigment Yellow 62:1) or one of its readily soluble salts, such as the sodium salt or potassium salt, for example, in the pigment preparation of the invention.

The addition of the pigment dispersant to the base pigment can take place at any point in the preparation process of the base pigment and in a variety of forms: for example, the pigment dispersant can be added as a suspension or as a water-moist presscake to the suspension of the base pigment; the water-moist presscakes of the base pigment and of the pigment dispersant can be mixed in corresponding apparatus, or they are mixed with one another in dry form, such as in the form of granules or powders, for example. Addition of the pigment dispersant before the base pigment is isolated, for example, may also take place before or after the base pigment suspension has been subjected to a thermal treatment.

In the case of the joint synthesis the azo couplings may in principle take place batchwise, directly or indirectly, i.e., by adding the diazonium salt to the coupler or vice versa, or else it is possible to select a continuous procedure, through the use of a mixing nozzle, a microreactor or a microjet reactor, with simultaneous, continuous feeding of the diazonium salt and of the coupling component.

Both the diazonium salt and the coupling component can be used in solution or as a suspension, and in the case of indirect coupling the use of the coupling component in solid form is a further possibility.

The amine components of the base pigment and of the pigment dispersant can be diazotized together or separately.

In the case of direct coupling, the diazonium salts can be added separately or as a mixture, together, or in the case of indirect coupling they can be introduced together as an initial charge. In the case of direct coupling, the coupling components of the base pigment and of the pigment dispersant can be present together or, in the case of indirect coupling, they can be added together or separately.

It is also possible first to prepare one component (base pigment or pigment dispersant) and to carry out the azo coupling of the second component in the presence of the suspension of the first component.

The base pigment is preferably prepared by direct coupling, by adding the diazonium salt in solution or suspension form to the freshly precipitated suspension of the coupling component, and the pigment dispersant is added as a moist presscake or as a dry powder to the ready-prepared coupling suspension of the base pigment.

It can be advantageous to carry out the coupling in the presence of customary coupling promoters, such as long-chain amine oxides and phosphine oxides, for example.

Couplings in aqueous-organic or purely organic media may also be employed for the preparation of the coupling products.

The process parameters that are essential in azo coupling, such as time, temperature, pH, use of buffers, solvents or surfactants, for example, are known to the skilled worker from the literature.

In order to achieve the desired performance properties, and particularly the coloristic properties, it may be necessary to subject the coupling suspension of the base pigment to a heat treatment prior to final isolation, and this can be carried out in the presence or absence of the pigment dispersant. For this purpose the isolated, moist presscake of the prepigment can also be dispersed again in a liquid medium. Suitable liquid media, besides the coupling liquor and water, include organic solvents or a mixture of water and organic solvent, in which case the water and the organic solvent need not be fully miscible with one another either at room temperature or at any other temperature, in order to produce an application-specific crystal polymorph and/or crystal morphology and/or particle size distribution. In the case of the heat treatment, temperatures of 50 to 200° C., for example, may occur. Suitable organic solvents include the following: alcohols having 1 to 10 carbon atoms, glycols, polyglycols, ethers, glycol ethers, polyethylene glycol monomethyl ether, polyethylene glycol dimethyl ether, ketones, aliphatic acid amides, urea derivatives, cyclic carboxamides, nitriles, aliphatic or aromatic amines, optionally halogenated aliphatic hydrocarbons, optionally alkyl-, alkoxy-, nitro-, cyano- or halogen-substituted aromatic hydrocarbons, aromatic heterocycles, sulfones and sulfoxides, and mixtures of these organic solvents. Preferred solvents are $C_1$-$C_6$ alcohols, especially methanol, ethanol, n- and isopropanol, isobutanol, n- and tert-butanol, and tert-amyl alcohol; $C_3$-$C_6$ ketones, especially acetone, methyl ethyl ketone or diethyl ketone; tetrahydrofuran, dioxane, ethylene glycol, diethylene glycol or ethylene glycol $C_3$-$C_5$ alkyl ethers, especially 2-methoxyethanol, 2-ethoxyethanol, butyl glycol, toluene, xylene, ethylbenzene, chlorobenzene, o-dichlorobenzene, N,N-dimethylacetamide, N-methylpyrrolidone, dimethyl sulfoxide or sulfolane.

Auxiliaries may be added at any desired point in time, all at once or in two or more portions. They may be added, for example, prior to the actual coupling, prior to finishing, or only after finishing, or else by mixing in the dry state.

Suitable surfactants include anionic, or anion-active, cationic, or cation-active, and nonionic or amphoteric substances, or mixtures of these agents.

Examples of suitable anionic substances include fatty acid taurides, fatty acid N-methyltaurides, fatty acid isethionates, alkylphenylsulfonates, an example being dodecylbenzenesulfonic acid, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, examples being palmitic, stearic and oleic acid; the salts of these anionic substances and soaps, examples being alkali metal salts of fatty acids, naphthenic acids and resin acids, abietic acid for example, alkali-soluble resins, rosin-modified maleate resins for example, and condensation products based on cyanuric chloride, taurine, N,N'-diethylaminopropylamine and p-phenylenediamine. Preference is given to resin soaps, i.e., alkali metal salts of resin acids.

Examples of suitable cationic substances include quaternary ammonium salts, fatty amine oxalkylates, polyoxyalkyleneamines, oxalkylated polyamines, fatty amine polyglycol ethers, primary, secondary or tertiary amines, examples being alkylamines, cycloalkylamines or cyclized alkylamines, especially fatty amines, diamines and polyamines derived from fatty amines or fatty alcohols, and the oxalkylates of said amines, imidazolines derived from fatty acids, polyaminoamido or polyamino compounds or resins having an amine index of between 100 and 800 mg of KOH per g of the polyaminoamido or polyamino compound, and salts of these cationic substances, such as acetates or chlorides, for example.

Examples of suitable nonionic and amphoteric substances include fatty amine carboxyglycinates, amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts and alkylphenol polyglycol ethers.

The dispersants are added either during the actual preparation of pigments, but often, also, during the incorporation of the pigments into the application media that are to be colored: for example, during the preparation of paints or printing inks, by dispersing the pigments into the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers from a different class. These polymeric substances carry polar anchor groups such as, for example, hydroxyl, amino, imino and ammonium groups, carboxylic acid and carboxylate groups, sulfonic acid and sulfonate groups or phosphonic acid and phosphonate groups, and may also have been modified with aromatic substances. Dispersants may additionally also be aromatic substances modified chemically with functional groups. Dispersants of this kind are known to the skilled worker and in some cases are available commercially (e.g., Solsperse®, Avecia; Disperbyk®, Byk-Chemie; Efka®, Efka). A number of types will be named below, by way of representation, although in principle any desired other substances described can be employed, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids and carboxylic esters, urethane-containing polymers of ethylenically unsaturated monomers, urethane-modified polyesters, condensation products based on cyanuric halides, polymers containing nitroxile compounds, polyester amides, modified polyamides, modified acrylic polymers, dispersants with a comblike structure comprising polyesters and acrylic polymers, phosphoric esters, triazine-derived polymers, modified polyethers. These parent structures are in many cases modified further, by means for example of chemical reaction with further substances carrying functional groups, or by means of salt formation.

Anionic groups of the dispersants, surfactants or resins used as auxiliaries may also be laked, using for example Ca, Mg, Ba, Sr, Mn or Al ions or using quaternary ammonium ions.

By fillers and/or extenders are meant a multiplicity of substances in accordance with DIN 55943 and DIN EN 971-1, examples being the various types of talc, kaolin, mica, dolomite, lime, barium sulfate or titanium dioxide. In this context it has proven particularly appropriate to make the addition before the pulverization of the dried pigment preparation.

The pigment preparation of the invention can be employed as a preferably aqueous presscake or as moist granules, but generally comprises solid systems of free-flowing, pulverulent nature, or granules.

The pigment preparations of the invention can be employed for pigmenting high molecular weight organic materials of natural or synthetic origin: for example, plastics, resins, varnishes, paints, electrophotographic toners and developers, electret materials, color filters, and also inks, including printing inks, and seed.

High molecular weight organic materials which can be pigmented with the pigment preparations of the invention are, for example, cellulose compounds, such as, for example, cellulose ethers and cellulose esters, such as ethylcellulose, nitrocellulose, cellulose acetates or cellulose butyrates, natural binders, such as, fatty acids, fatty oils, resins and their conversion products, for example, or synthetic resins such as polycondensates, polyadducts, addition polymers and copolymers, such as, for example, amino resins, especially urea- and melamine formaldehyde resins, alkyd resins, acrylic resins, phenolic resins, such as novolaks or resoles, urea resins, polyvinyls, such as polyvinyl alcohols, polyvinyl acetals, polyvinyl acetates or polyvinyl ether, polycarbonates, polyolefins, such as polystyrene, polyvinyl chloride, polyethylene or polypropylene, poly(meth)acrylates and copolymers thereof, such as polyacrylic esters or polyacrylonitriles, polyamides, polyesters, polyurethanes, coumarone-indene resins and hydrocarbon resins, epoxy resins, unsaturated synthetic resins (polyesters, acrylates) with the different cure mechanisms, waxes, aldehyde resins and ketone resins, vulcanized rubber, unvulcanized rubber and derivatives and latices thereof, casein, silicones and silicone resins; individually or in mixtures.

It is unimportant here whether the aforementioned high molecular weight organic compounds are present in the form of plastic masses, melts, or in the form of spinning solutions, dispersions, varnishes, paints or printing inks. Depending on the intended use it proves advantageous to utilize the pigment preparations of the invention in the form of a blend or in the form of prepared products or dispersions. Based on the high molecular weight organic material to be pigmented, the pigment preparations of the invention are employed in an amount of 0.05% to 30% by weight, preferably 0.1% to 15% by weight.

The pigment preparations of the invention are also suitable for use as colorants in electrophotographic toners and developers, such as, for example, one- or two-component powder toners (also called one- or two-component developers), magnetic toners, liquid toners, latex toners, polymerization toners, and specialty toners.

Typical toner binders are addition-polymerization resins, polyaddition resins, and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may also include further ingredients, such as charge control agents, waxes or flow assistants, or may be modified subsequently with these added ingredients.

The pigment preparations of the invention are additionally suitable for use as colorants in powders and powder coating materials, particularly in triboelectrically or electrokinetically sprayable powder coating materials which are employed to coat the surfaces of articles made, for example, from metal, wood, plastic, glass, ceramic, concrete, textile material, paper or rubber.

As powder coating resins use is made typically of epoxy resins, carboxyl- and hydroxyl-containing polyester resins, polyurethane resins, and acrylic resins, together with customary hardeners. Combinations of resins are also employed. For example, epoxy resins are frequently used in combination with carboxyl- and hydroxyl-containing polyester resins. Typical hardener components (depending on the resin system) are, for example, acid anhydrides, imidazoles, and also dicyandiamide and the derivatives thereof, masked isocyanates, bisacylurethanes, phenolic resins and melamine resins, triglycidyl isocyanurates, oxazolines, and dicarboxylic acids.

The invention further provides for the use of the inventive pigment preparations as colorants for printing inks, particularly for ink-jet inks.

By ink-jet inks are meant not only waterborne inks (including microemulsion inks) but also nonaqueous ("solvent-based") inks, UV-curable inks, and inks which operate in accordance with the hot-melt process.

Solvent-based ink-jet inks contain essentially 0.5 to 30% by weight, preferably 1% to 15% by weight, of the pigment preparation of the invention, 70% to 95% by weight of an organic solvent or solvent mixture and/or of a hydrotropic compound. Where appropriate, the solvent-based ink-jet inks may comprise carrier materials and binders which are soluble in the "solvent", such as polyolefins, natural and synthetic rubber, polyvinyl chloride, vinyl chloride/vinyl acetate copolymers, polyvinyl butyrals, wax/latex systems or combinations of these compounds. The solvent-based ink-jet inks may further comprise, where appropriate, binders and additional additives, such as wetting agents, degassing/defoaming agents, preservatives, and antioxidants, for example.

Microemulsion inks are based on organic solvents, water, and, optionally, an additional substance that acts as an interface mediator (surfactant). Microemulsion inks contain 0.5% to 30% by weight, preferably 1% to 15% by weight, of a pigment preparation of the invention, 0.5% to 95% by weight of water, and 0.5% to 95% by weight of organic solvents and/or interface mediator.

UV-curable inks contain essentially 0.5% to 30% by weight of a pigment preparation of the invention, 0.5% to 95% by weight of water, 0.5% to 95% by weight of an organic solvent or solvent mixture, 0.5 to 50% by weight of a radiation-curable binder, and, if desired, 0 to 10% by weight of a photoinitiator. Hot-melt inks are based usually on waxes, fatty acids, fatty alcohols or sulfonamides which are solid at room temperature and liquefy on heating, the preferred melting range being between about 60 and about 140° C.

Hot-melt ink-jet inks are composed essentially of 20% to 90% by weight of wax and 1% to 10% by weight of a pigment preparation of the invention. They may further include 0 to 20% by weight of an additional polymer (as "dye dissolver"), 0 to 5% by weight of dispersant, 0 to 20% by weight of viscosity modifier, 0 to 20% by weight of plasticizer, 0 to 10% by weight of tack additive, 0 to 10% by weight of transparency stabilizer (which prevents, for example, crystallization of the wax), and 0 to 2% by weight of antioxidant.

The printing inks of the invention, especially ink-jet inks, can be prepared by dispersing the colorant preparations into the microemulsion medium or into the nonaqueous medium or into the medium for preparing the UV-curable ink or into the wax for preparing a hot-melt ink-jet ink.

It is appropriate to carry out subsequent filtration of the resultant printing inks for ink-jet applications (via a 1 μm filter, for example).

Additionally the pigment preparation of the invention is also suitable for use as a colorant for color filters, both for additive and for subtractive color generation, and also as a colorant for electronic inks (or e-inks) or electronic paper (e-paper).

In the production of what are known as color filters, both reflective and translucent color filters, pigments are applied in the form of a paste or as pigmented photoresists in suitable binders (acrylates, acrylic esters, polyimides, polyvinyl alcohols, epoxides, polyesters, melamines, gelatins, caseins) to the respective LCD components (e.g., TFT-LCD-Thin Film Transistor Liquid Crystal Displays or, e.g., (S) TN-LCD-(Super) Twisted Nematic-LCD). Besides high thermal stability, high pigment purity is a prerequisite for a stable paste and/or a pigmented photoresist. Furthermore, the pigmented color filters can also be applied by ink-jet printing processes or other suitable printing processes.

It was surprising that the pigment preparation of the invention comprising P.Y. 74 and P.Y. 62 displays advantages in comparison with the preparation comprising P.Y. 74 and P.Y. 168 as disclosed in U.S. Pat. No. 3,759,733, example 14, both in the context of use in solvent-borne printing ink systems and in aqueous printing inks systems. Additionally it was surprising that the pigment preparation of the invention displays advantages even in systems completely different from printing ink systems, such as plastics systems and coating systems.

In order to assess the properties in the plastics sector a selection was made, from among the multiplicity of known plastics, of a high-density polyethylene (HDPE). In order to assess the properties of the pigments in the printing sector a selection was made, from among the multiplicity of known printing systems, of a nitrocellulose-based, alcohol-ester gravure printing system (NC) and of an aqueous, acrylic resin-based flexographic printing system (FP).

In order to assess the properties of the pigments in the coatings sector, in water-free, solvent-based varnish systems, a selection was made, from among the multiplicity of known varnishes, of a polyester varnish (PE) based on cellulose acetobutyrate and a melamine resin, and of an-air-drying varnish (LA) based on a long-oil alkyd resin.

In order to assess the properties of the pigments in the coatings sector, in aqueous varnish systems, a selection was made, from among the multiplicity of known varnish systems, of an aqueous, polyurethane-based varnish (PU).

In order to assess the suitability of the pigment preparations for use in the production of electrophotographic toners, their dispersibility in aqueous systems was tested. For this purpose an aqueous, polyvinyl acetate (PVA)-based white emulsion paint was selected. The pigment preparation is stirred in the form of an aqueous dispersion into this PVA system. The aqueous dispersion is composed of 17% by weight pigment preparation, 1.5% by weight anionic dispersant (e.g., sulfate or sulfonate), and 81.5% by weight water, and is prepared by bead milling using ceramic beads having a diameter of 0.4 to 0.6 mm.

The color strength and the chroma were determined in accordance with DIN 5033, DIN 55986, and DIN 53235.

The rheology of the millbase following dispersion was evaluated visually on the basis of the following five-point scale:
5 highly fluid
4 liquid
3 viscous
2 slightly set
1 set The viscosity was determined after the millbase had been diluted to the final pigment concentration, using the Rossmann viscospatula, type 301 from Erichsen.

The viscosity of the printing inks was measured by means of a rotational viscometer.

Gloss measurements were carried out on cast films at an angle of 20° in accordance with DIN 67530 (ASTMD 523) using the multigloss gloss meter from Byk-Mallinckrodt.

In the examples below, parts and percentages are each by weight.

INVENTIVE EXAMPLE 1 a) Diazo Component 84 parts of 5-nitro-2-aminoanisole are suspended in 210 parts of water and 132.2 parts of 31% hydrochloric acid. The suspension is cooled to 0° C. with 420 parts of an ice/water mixture and diazotized by addition of 85.2 parts of 40% strength sodium nitrite solution.

b) Coupler 1345 parts of water and 104 parts of 25% strength sodium hydroxide solution are used to dissolve 103.5 parts of acetoacetyl-o-anisidide. Following the addition of 3.5 parts of a 20% strength aqueous solution of sodium lauryl sulfate, the solution is cooled to 10° C. by addition of ice. The coupler is precipitated by adding 48.1 parts of 80% acetic acid. Then a solution of 20 parts of a maleic acid-modified rosin ester in 168 parts of water and 27.3 parts of 25% strength sodium hydroxide solution are added and the pH is adjusted to 9.8 using 80% acetic acid.

c) Coupling

The diazo component is added to the coupler in one hour.

d) Addition of the Pigment Dispersant and of an Auxiliary 3.9 parts of C.I. Pigment Yellow 62 and 3.9 parts of hydrogenated tallow amine, dissolved in 50 parts of water with 6.4 parts of 80% acetic acid, are added. The mixture is then stirred at 80° C. for 17 hours. The suspension is filtered and the presscake is dried at 130° C.

In the PE, LA, and PU systems, strongly colored transparent finishes with a clean hue are obtained.

In the HDPE system, strong colorations with high chromaticity (chroma) are obtained.

In the NC and FP systems, strongly colored prints are obtained with a clean hue, high gloss and high transparency; the viscosity of the printing ink is low.

In the PVA system, strongly colored and transparent colorations of a clean hue are obtained. This shows the good dispersibility.

COMPARATIVE EXAMPLE 1

Example 1 is carried out with the sole difference that 3.9 parts of C.I. Pigment Yellow 168 are used in place of the 3.9 parts of C.I. Pigment Yellow 62.

Advantages of inventive example 1 over comparative example 1 Inventive example 1 is tested against comparative example 1 in a variety of systems.

| Test system | Inventive example 1 | Comparative example 1 |
|---|---|---|
| HDPE | color strength: 1154 mg/kg for ⅓ standard depth of color chroma: 99.7 | color strength: 1686 mg/kg for ⅓ standard depth of color chroma: 93.7 |
| PE | markedly higher color strength than comparative example 1 | markedly lower color strength than inventive example 1 |
| NC | viscosity: 79 mPas | viscosity: 98 mPas |
| FP | viscosity: 106 mPas | viscosity: 113.5 mPas |

In the HDPE system example 1 shows heightened color strength and chroma; in the printing systems, reduced rheology; in the PE system, heightened color strength.

INVENTIVE EXAMPLE 2

380 g of a commercial pigment P.Y. 74 are mixed mechanically with 20 g of pigment dispersant P.Y. 62.

In the FP and NC systems, strongly colored prints of high purity are obtained; the viscosity of the printing inks is low.

INVENTIVE EXAMPLE 3

380 g of a commercial pigment P.Y. 74 are mixed mechanically with 40 g of pigment dispersant P.Y. 62.

In the FP and NC systems, strongly colored prints of high purity are obtained; the viscosity of the printing inks is low.

INVENTIVE EXAMPLE 4

Synthesis of P.Y. 62, unlaked a) Diazo Component 109 parts of o-nitroaniline-p-sulfonic acid are suspended in 210 ml of water and 118 ml of 31% hydrochloric acid. The suspension is cooled to 4° C. with ice and diazotized with 65 ml of 40% strength sodium nitrite solution.

b) Coupler 1345 ml of water, 80 ml of 25% strength sodium hydroxide solution, and 95.5 g of acetoacetyl-o-toluidide are stirred for 1 h. The solution is cooled to 10° C. with ice, and then the coupler is precipitated with 45 ml of 80% acetic acid. The pH is adjusted to 6.0 using acetic acid.

c) Coupling

The diazo suspension is added beneath the surface of the suspension of coupling material. The coupling suspension is filtered and the presscake is washed with water. This gives a 30% water-moist presscake of the unlaked P.Y. 62.

INVENTIVE EXAMPLE 5 a) Diazo Component 42 parts of 5-nitro-2-aminoanisole are suspended in 105 parts of water and 59 ml of 31% hydrochloric acid. The suspension is cooled to 0° C. with ice and diazotized by addition of 33 ml of 40% strength sodium nitrite solution.

b) Coupler and Pigment Dispersant 672 ml of water and 40 ml of 25% strength sodium hydroxide solution are used to dissolve 51.7 parts of acetoacetyl-o-anisidide. Following the addition of 1.8 parts of a 30% strength aqueous solution of sodium lauryl sulfate the solution is cooled to 10° C. by addition of ice. The coupler is precipitated by addition of 22 ml of 80% acetic acid. The pH is adjusted to 6 to 7 with acetic acid. Then a solution of 10 parts of a maleic acid-modified rosin ester in 84 ml of water and 10.5 ml of 25% strength sodium hydroxide solution is added and the pH is adjusted to 9.8 with 80% acetic acid. 3.2 parts of a 30% water-moist presscake of unlaked P.Y. 62, produced in accordance with example 4, are added.

c) Coupling

The diazo component is added to the coupler in one hour.

d) Addition of an Auxiliary and Laking of the Pigment Dispersant 4.8 parts of cocoamine are added. Then 0.3 part of calcium chloride, dissolved in 30 parts of water, is added. The solution is heated to 80° C. with steam and stirred at 80° C. for 17 hours. The suspension is filtered and the presscake is dried at 130° C.

Strongly colored prints are obtained in the NC system with a clean hue and with high gloss and transparency; the viscosity of the printing ink is low.

The invention claimed is:

1. A pigment preparation comprising C.I. Pigment Yellow 74 of formula (I) as base pigment and C.I. Pigment Yellow 62 of formula (II) as pigment dispersant

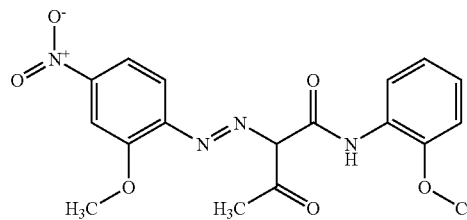

(I)

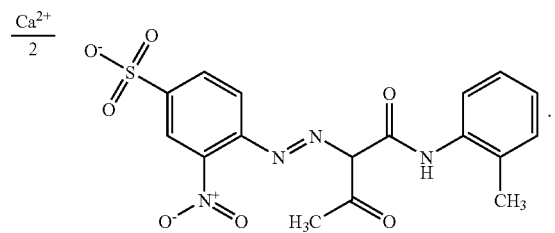

(II)

2. The pigment preparation as claimed in claim 1, containing
a) 50% to 99.9% by weight of the C.I. Pigment Yellow 74,
b) 0.1% to 25% by weight of the C.I. Pigment Yellow 62
c) 0 to 25% by weight of at least one auxiliary,
the weight percentages of the respective components being based on the total weight of the preparation, 100% by weight.

3. The pigment preparation as claimed in claim 1, containing
a) 60% to 99.5% by weight of the C.I. Pigment Yellow 74,
b) 0.5% to 15% by weight of the C.I. Pigment Yellow 62
c) 0.1 to 15% by weight of at least one auxiliary,
the weight percentages of the respective components being based on the total weight of the preparation, 100% by weight.

4. The pigment preparation as claimed in claim 1, containing
a) 65% to 99% by weight of the C.I. Pigment Yellow 74,
b) 1% to 10% by weight of the C.I. Pigment Yellow 62
c) 0.1 to 15% by weight of at least one auxiliary, the weight percentages of the respective components being based on the total weight of the preparation, 100% by weight.

5. A process for producing a pigment preparation as claimed in claim 1, comprising the step of mixing the base pigment and the pigment dispersant, and, optionally, at least one auxiliary.

6. A process for producing a pigment preparation as claimed in claim 1, comprising the step of jointly synthesizing the pigment dispersant and the base pigment.

7. A high molecular weight organic material of natural or synthetic origin pigmented by the pigment preparation as claimed in claim 1, wherein the high molecular weight organic material of natural or synthetic origin is selected from the group consisting of plastics, resins, varnishes, paints, electrophotographic toners, electrophotographic developers, electret materials, color filters, inks, ink-jet inks, printing inks, and seed.

8. A solvent-borne printing ink system comprising the pigment preparation as claimed in claim 1.

9. An aqueous printing ink system comprising the pigment preparation as claimed in claim 1.

* * * * *